United States Patent [19]

Lee et al.

[11] 4,329,721
[45] May 11, 1982

[54] TACHOMETER FOR DERIVING AVERAGE VELOCITY OUTPUT BY SAMPLING POSITION SIGNAL

[75] Inventors: Patrick S. Lee, Campbell; John Cuda, Saratoga, both of Calif.

[73] Assignee: Sperry Corporation, New York, N.Y.

[21] Appl. No.: 120,453

[22] Filed: Feb. 11, 1980

[51] Int. Cl.³ .................. G11B 19/14; G11B 21/08
[52] U.S. Cl. ................................. 360/78; 360/75; 318/618; 318/653
[58] Field of Search .................. 360/78, 77, 97–98, 360/106, 75; 318/618, 653, 326–328, 561, 603, 594; 324/177

[56] References Cited

U.S. PATENT DOCUMENTS

| | | | |
|---|---|---|---|
| 3,820,712 | 6/1974 | Oswald | 318/618 |
| 3,883,894 | 5/1975 | Johnson | 360/78 |
| 4,134,053 | 1/1979 | Klinger | 360/75 |
| 4,168,457 | 9/1979 | Rose | 360/78 |
| 4,184,108 | 1/1980 | Sordello et al. | 318/618 |
| 4,217,612 | 8/1980 | Matla et al. | 360/78 |

FOREIGN PATENT DOCUMENTS 2020864  9/1979  United Kingdom .................. 360/78

OTHER PUBLICATIONS

IBM Tech. Disc. Bull., D. E. Brownback et al., Measuring and Adjusting Speed of Magnetic Disk Access Arm, vol. 19, No. 7, Dec. 1976, pp. 2686–2687.
IBM Tech. Disc. Bull., G. B. Fisher, Disk Accessing System, vol. 19, No. 3, Aug. 1976, pp. 1103–1104.
IEEE Transactions on Magnetics, vol. Mag.–11, No. 5, Sep. 1975, pp. 1245–1246, R. K. Oswald, An Electronic Tackometer for Disk File Motion Control.

*Primary Examiner*—Alfred H. Eddleman
*Attorney, Agent, or Firm*—Thomas H. Olson; Eugene T. Battjer

[57] ABSTRACT

A tachometer for generating a velocity signal in a data disc pack servo system comprising a sampling pulse generator for producing pulses that are spaced from one another by a constant amount representative of a distance increment of radial movement of a servo head in the system, a timer for measuring the time between the sampling pulses, the timer including a clock pulse source and a counter which is started by one sampling pulse and reset by the next succeeding sampling pulse so that the digital output thereof is proportional to time and a computer for computing average velocity by deriving the quotient of the distance increment divided by the time required for the servo head to traverse such distance increment.

1 Claim, 2 Drawing Figures

4,329,721

TACHOMETER FOR DERIVING AVERAGE VELOCITY OUTPUT BY SAMPLING POSITION SIGNAL

BACKGROUND OF THE INVENTION

1. Field of the Invention

This invention relates to a tachometer for use in a disc pack servo system and more particularly to a tachometer that produces an output signal having a magnitude proportional to the average velocity of radial movement of a servo head in such system.

2. Description of the Prior Art

In disc data storage systems, data is stored on concentric tracks on a magnetic disc surface. In order accurately and quickly to access the data stored on a prescribed track, it is imperative that the speed of radial movement of the magnetic heads be measured continuously and accurately. This is recognized in the known prior art and various tachometers for producing velocity information are disclosed.

Among the known tachometer systems are those utilizing an independent transducer such as a magnetic transducer, those using an independent position transducer such as an optical system (e.g. U.S. Pat. No. 3,568,059 to Sordello and U.S. Pat. No. 3,811,091 to Ha et al.), those deriving a position signal from the disc pack and differentiating that signal with respect to time (e.g. U.S. Pat. No. 3,534,344 to Santana), those integrating the motor current which is proportional to acceleration (e.g. Sordello, supra), and those employing two or more of the above enumerated expedients in combination. These prior art tachometers employ analog circuits to perform the velocity calculation. Not only are sophisticated analog circuits complex, but they are also limited in frequency response. The limitation of frequency response increases in importance as advancements in disc technology make possible greater and greater densities of data storage.

SUMMARY OF THE INVENTION

The generation in disc pack servo systems of a signal known as a position signal is well known. The position signal is constituted by a plurality of triangular waves which are produced as a servo head radially traverses a plurality of prerecorded servo tracks in a disc pack. Also known is the fact that the slope of the ascending and descending portions of the position signal represents the radial speed of the servo head. A relatively flat slope represents a relatively slow radial speed and a relatively steep slope represents a relatively fast radial speed. According to the present invention, a voltage representative of a fixed incremental distance $\Delta x$ is employed; $\Delta x$ represents both a fixed increment of radial movement and a fixed increment of voltage in the position signal. The time required for the position signal to change by the increment $\Delta x$ is inversely proportional to the average speed of radial head movement, as is clear from the relationship represented by the equation $v_{avg} = (\Delta x / \Delta t)$.

According to the present invention, a voltage representative of the quantity $\Delta t$ is derived by utilizing a clock pulse source that produces a series of regularly recurring clock pulses, counting the number of clock pulses that occur during the distance increment $\Delta x$, and deriving a voltage having a magnitude proportional to the number. Such voltage is employed calculating the average velocity.

The objects, features and advantages of the present invention will be more apparent after referring to the following specification and the accompanying drawings.

DESCRIPTION OF THE PREFERRED EMBODIMENT

Figure 1:
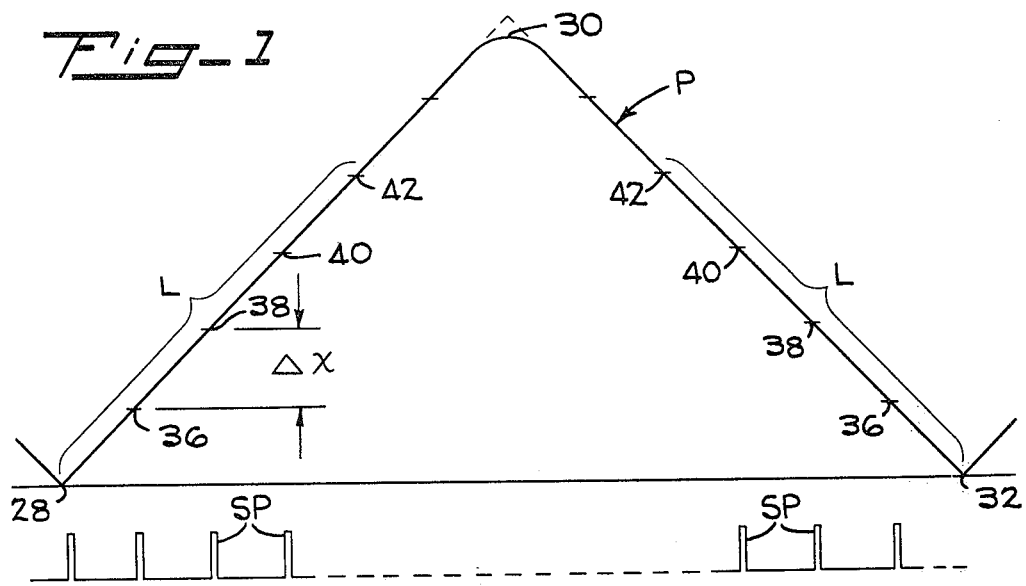
FIG. 1 is a graph of time versus voltage for a position signal and other signals produced in accordance with the invention.
Figure 2:
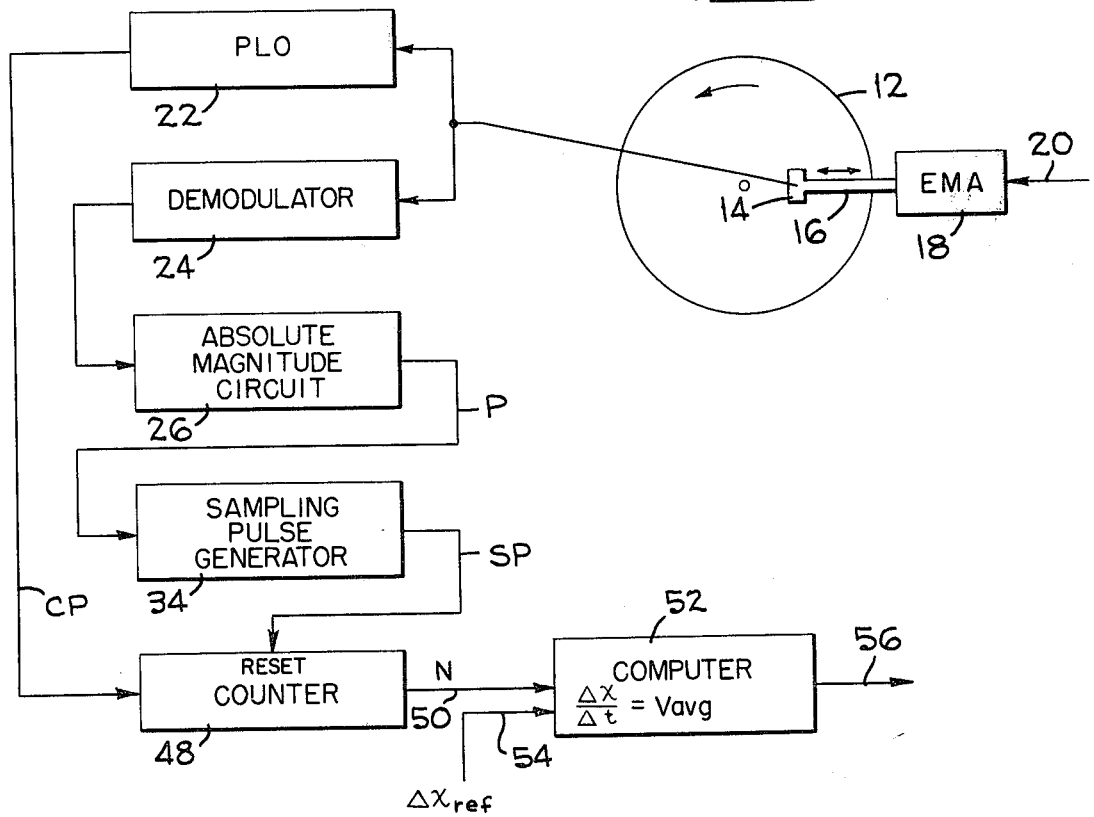
FIG. 2 is a block diagram showing a preferred embodiment of the invention.

Referring more particularly to the drawings, reference numeral 12 indicates a servo disc in a disc pack data storage system. Disc 12 is one of many disc surfaces in a typical disc pack, the remaining disc surfaces being employed to store data. Associated with servo surface 12 is a servo head 14. Servo head 14 is carried on a rod 16 by which the servo head is suspended adjacent servo surface 12 so that the prerecorded servo tracks on the servo surface will induce appropriate signals in head 14 in response to relative movement therebetween. Rod 16 is supported by an electromagnetic actuator (EMA) 18, appropriate signals to the actuator serving to move servo head 14 radially of disc surface 12. EMA 18 has an input terminal 20 to which a current is applied from other circuitry (not shown) within the disc pack servo system for appropriately activating the EMA when the servo head is to be moved from one radial position to another radial position. Data read/write heads (not shown) move in unison with the servo head.

In response to rotative movement of disc surface 12 with respect to servo head 14, repetitive sync pulses are generated, and such sync pulses are employed to synchronize a phase locked oscillator (PLO) 22. The output of PLO 22 is indicated hereinafter as CP and constitutes a series of regularly recurring pulses or clock pulses. In response to the radial movement of head 14 across the servo tracks prerecorded on disc 12, there is produced an alternating voltage signal that varies from a minimum when servo head 14 is aligned with a negatively polarized servo track to a maximum when the servo head is aligned over a positively polarized servo track. When the servo head is midway between two oppositely polarized servo tracks, the level of the signal produced from the servo head is zero because the oppositely polarized effect induced by the two tracks cancel one another. Such alternating signal is demodulated by a demodulator 24 and the output of the demodulator is connected through an absolute magnitude circuit 26 which produces at its output the position signal P. As can be seen in FIG. 1, position signal P varies from zero volts at a point 28 when it is midway between two servo tracks to a peak 30 when it is aligned over one of the servo tracks and back to a zero level 32 when it is midway between two different tracks. The position signal P has linear portions L in which the slope of the signal is representative of radial speed of head 14.

The distance along the abscissa of FIG. 1 from point 28 to point 32 represents the time required for servo head 14 to travel radially from one intertrack position on servo surface 12 to an adjacent intertrack position. At radial speeds greater than that represented by position signal P, the time will be less and at radial speeds lower, the time will be more. Thus, the shape of signal P depicted in FIG. 1 represents only one specific radial speed.

Signal P constitutes the input of a sampling pulse generator 34. Sampling pulse generator 34 operates to produce at least two pulses as position signal P attains two different prescribed magnitudes. By way of example, the position signal P shown in FIG. 1 has a theoretical maximum amplitude of nine volts, the voltage level at peak 30 being somewhat less than nine volts because of magnetic phenomena well understood by those skilled in this art. As the position signal P increases from zero volts at point 28 to the peak, it passes through a 1.5 volt level 36, a 3 volt level 38, a 4.5 volt level 40 and a 6 volt level 42. The position signal, as it descends in magnitude after passing peak 30, passes through the same voltage levels as it moves toward the zero voltage level at point 32. Sampling pulse generator 34 includes means for producing a sampling pulse SP as the position signal attains each of the above levels. The distance along the ordinate in FIG. 1 between each pair of adjacent voltage levels represents a constant distance increment, denoted as $\Delta x$. The distance between adjacent sampling pulses SP along the abscissa is representative of time, such time being referred to herein as $\Delta t$ and being greater for slow speeds (relatively flat slope of linear portion L) than for fast speeds (relatively steep slope of linear portion L).

The sampling pulses SP are connected to the reset input of a counter 48 and the clock pulses CP are applied to the counting input thereof. Consequently, counter 48 operates to count the number of clock pulses that occur between each sampling pulse SP so that the output of the counter at 50 is a number N that is representative of the time required for position signal P to change by one distance increment $\Delta x$. Because $\Delta x$ is constant (by virtue of the construction and arrangement of sampling pulse generator 34) the average velocity of the head, i.e. the slope of position signal P, is inversely proportional to N.

The output 50 of counter 48 is connected to a computer circuit 52. Computer 52 has a reference voltage input terminal 54 to which is connected a fixed voltage representative of the fixed magnitude of $\Delta x$. The computer has a second input to which the output 50 of counter 48 is connected. On the second input appears a voltage representative of N (which in turn is representative of $\Delta t$). The computer, a conventional device, is constructed and arranged to perform the calculation $v_{avg} = (\Delta x/\Delta t)$. Because $\Delta x$ is constant, the computer circuitry is extremely simple and straightforward. Accordingly, at the output 56 of the computer there appears a tachometer signal which is a voltage having a magnitude proportional to the average radial velocity $v_{avg}$.

To recapitulate the operation of the device, it will be seen that the slope of linear portion L of position signal P corresponds to the radial speed of servo head 14 with respect to disc 12. From such linear portion are derived at least two sampling pulses SP, the interval between the sampling pulses representing a fixed distance. The clock pulse CP produced by PLO 22 is applied to counter 48 so as to count a given number of pulses during the interval defined between adjacent sampling pulses SP. If the radial speed of the servo head is fast, the time between adjacent sampling pulses SP will be short and the number N will be correspondingly small. Contrariwise, if the radial speed of servo head 14 is slow, the time between adjacent sampling pulses SP will be relatively long and the count N will be relatively high. A signal representative of the magnitude of N is applied to computer 52 which produces an output signal $v_{avg}$ that has a magnitude inversely proportional to time and directly proportional and representative of velocity.

Thus it will be seen that the present invention provides an average value tachometer and a method for employing the same which is relatively simple, uncomplex in implementation and accurate. Although one embodiment of the invention has been shown and described, it will be obvious that other adaptations and modifications can be made without departing from the true spirit and scope of the invention.

What is claimed is:

1. An electronic tachometer for producing a signal indicative of the average speed $V_{avg}$ of a disc pack data storage system servo head moving radially of a rotating servo disc having a plurality of concentric servo tracks recorded thereon, comprising:

\* \* \* \* \*

UNITED STATES PATENT OFFICE  Page 1 of 2
CERTIFICATE OF CORRECTION

Patent No. 4,329,721            Dated May 11, 1982

Inventor(s) Patrick Siu-Kee Lee et al

It is certified that error appears in the above-identified patent and that said Letters Patent are hereby corrected as shown below:

Column 4, following Line 44, should read as follows:

A demodulator coupled to the servo head to produce, in response to the signal generated by the servo head, a position signal having a substantially triangular waveform characterized by linear regions between alternate minimum and maximum points of constant amplitude each corresponding to the center of a respective servo track, means coupled to receive the position signal for generating a succession of sampling pulses each corresponding to a discrete predetermined amplitude of the position signal in the linear region between adjacent minimum and maximum points, the difference in amplitude between adjacent predetermined amplitudes of the position signal being representative of a prescribed incremental distance $\Delta X$, a counter connected to receive the sampling pulses and uniformly recurring clock pulses for counting the number of clock

UNITED STATES PATENT OFFICE
CERTIFICATE OF CORRECTION

Patent No. 4,329,721            Dated      May 11, 1982

Inventor(s) Patrick Siu-Kee Lee et al

It is certified that error appears in the above-identified patent and that said Letters Patent are hereby corrected as shown below:

pulses occurring in each interval between successive sampling pulses and producing a signal which has a magnitude proportional to the count and representative of the time $\Delta t$ between successive sampling pulses, and means coupled to receive the signal indicative of $\Delta t$ and a signal indicative of $\Delta X$ for computing the quantity $v_{avg} = \frac{\Delta X}{\Delta t}$.

Signed and Sealed this

Thirty-first Day of August 1982

[SEAL]

Attest:

GERALD J. MOSSINGHOFF

Attesting Officer      Commissioner of Patents and Trademarks